(12) United States Patent
Hjelm

(10) Patent No.: US 8,782,733 B2
(45) Date of Patent: Jul. 15, 2014

(54) METHOD AND SYSTEM FOR UPDATING AN INTERACTION DOCUMENT

(75) Inventor: Johan Hjelm, Tokyo (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 82 days.

(21) Appl. No.: 12/935,566

(22) PCT Filed: Jun. 30, 2008

(86) PCT No.: PCT/SE2008/050807
§ 371 (c)(1),
(2), (4) Date: Sep. 29, 2010

(87) PCT Pub. No.: WO2009/123521
PCT Pub. Date: Oct. 8, 2009

(65) Prior Publication Data
US 2011/0029643 A1   Feb. 3, 2011

(30) Foreign Application Priority Data

Apr. 3, 2008 (WO) .................. PCT/SE2008/050382

(51) Int. Cl.
*H04N 7/16* (2011.01)

(52) U.S. Cl.
USPC ............................................. 725/136; 725/50

(58) Field of Classification Search
None
See application file for complete search history.

(56) References Cited

U.S. PATENT DOCUMENTS

| | | |
|---|---|---|
| 5,585,858 A | 12/1996 | Harper et al. |
| 2003/0163832 A1* | 8/2003 | Tsuria et al. .................. 725/135 |
| 2004/0156620 A1 | 8/2004 | Horie et al. |
| 2005/0079863 A1* | 4/2005 | Macaluso ..................... 455/419 |
| 2005/0091690 A1 | 4/2005 | Delpuch et al. |
| 2005/0210501 A1 | 9/2005 | Zigmond et al. |
| 2006/0019618 A1 | 1/2006 | Seppala |
| 2007/0072543 A1 | 3/2007 | Paila et al. |
| 2007/0220066 A1 | 9/2007 | Collacott et al. |

FOREIGN PATENT DOCUMENTS

| | | |
|---|---|---|
| JP | 2002051326 A | 2/2002 |
| JP | 2005304013 A | 10/2005 |

(Continued)

OTHER PUBLICATIONS

Newton, P. et al. "Recording Interactive TV." IEEE Transactions on Consumer Electronics, vol. 51, No. 2, May 2005, pp. 540-544.

(Continued)

*Primary Examiner* — Christopher Brown
(74) *Attorney, Agent, or Firm* — Coats & Bennett, P.L.L.C.

(57) ABSTRACT

User interactions with an interactive media program are defined by an interaction document, such as a SMIL document, that may be downloaded by a user before playing or viewing of the associated media program. In the case of live events that are recorded by the user for later viewing, the interactions that may have taken place during the original scheduled broadcast of the event may no longer be valid. In this case, a method and apparatus is provided to allow the user downloading an interaction document for a media program to receive updated versions of the interaction document that can be used when viewing a recording of the media program. In one exemplary embodiment, the media playback system sends a request for an interaction document to an interaction document server responsive to the recording of the interactive media program. The interaction document server may send the updated interaction document to the media playback system responsive to the request if one is available.

14 Claims, 5 Drawing Sheets

(56) References Cited

FOREIGN PATENT DOCUMENTS

| | | | |
|---|---|---|---|
| JP | 2006148942 | A | 6/2006 |
| JP | 2008252367 | A | 10/2008 |
| WO | 2006008675 | A1 | 1/2006 |
| WO | 2006/114413 | A1 | 11/2006 |
| WO | 2007/029099 | A1 | 3/2007 |

OTHER PUBLICATIONS

Shim, S. et al., "A SMIL Based Graphical Interface for Interactive TV", Proceedings of SPIE, Jan. 2003, pp. 257-266, vol. 5018, US.
Tan, J., et al., "Solutions and systems for recording interactive TV", Seventh International Symposium on Optical Storage, Apr. 6, 2005, pp. 596623-1-596623-7, vol. 5966.

* cited by examiner

METHOD AND SYSTEM FOR UPDATING AN INTERACTION DOCUMENT

TECHNICAL FIELD

The present invention relates generally to interactive media systems that enable users to interact with media programs and, more particularly, to a method of sizing and allocating resources to handle interactions with the viewers.

BACKGROUND

Interactive media comprises media that allows the viewer to become an active participant in a media program. For example, in interactive television systems viewers may compete against contestants in a game show, place orders for advertised products, provide questions or commentaries about program content, request information about the media program or subjects of the media program, etc. In many cases, viewer feedback may effect how the program continues. An example of viewer feedback affecting media content is a real-time programming (e.g., talent shows, reality shows) in which real-time voting by viewers results in decisions that affect how the show continues.

The practice of time shifting, recording programs for later viewing, may create problems with interactive television. One problem is the possible invalidity of interaction events after the original transmission of the media program. Interaction events that occur during an original broadcast of a program may not be valid during subsequent viewings of a recording of the program. For example, voting events that take place during the original broadcast may no longer be valid when the recording is viewed. In this case, prompts to the viewer to cast votes may be annoying to many users, and some users may become frustrated when they try to cast votes.

SUMMARY

The present invention relates to an interaction media system for delivering interactive media programs, such as video programs, to users. User interactions with an interactive media program are defined by an interaction document, such as a SMIL document, that may be downloaded by a user before playing or viewing of the associated media program. The interaction document includes a timeline for triggering interaction events based on the run-time of the associated media program and is synchronized with the media program. When an interaction event is triggered, an overlaid browser may be displayed to the user and user input or responses may be captured and sent to an interaction server. The interaction document may be triggered by 35 the playback of the media program.

In the case of live events that are recorded by the user for later viewing, the interactions that may have taken place during the original transmission of the event may no longer be valid. In this case, a method and apparatus is provided to allow the user downloading an interaction document for a media program to receive updated versions of the interaction document that can be used when viewing a recording of the media program. In one exemplary embodiment, the media playback system sends a request for an interaction document to an interaction document server responsive to the recording of the interactive media program. The interaction document server may send the updated interaction document to the media playback system responsive to the request if one is available.

In another exemplary embodiment, the media playback system may subscribe to receive updates for an interaction document. The subscription can be created when the interaction document is first downloaded, or responsive to the recording of the media program. In response to the subscription request, the interaction document server may send an update to the media playback system when the interaction document is updated, or when a new version becomes available. In some embodiments, the update may comprise a notification that an updated version of the interaction document is available. The media playback system may then download the updated interaction document responsive to the notification. In other embodiments, the update may comprise the updated version of the interaction document.

In another exemplary embodiment, the media playback system may download an interaction document for use during viewing of a live broadcast of the media program. The downloading of the interaction document may function as an implicit subscription to updates. When an updated version of the interaction document is available, the interaction document server can upload or push the updated version of the interaction document to the media playback system without receiving an explicit download request.

DETAILED DESCRIPTION

Figure 1:
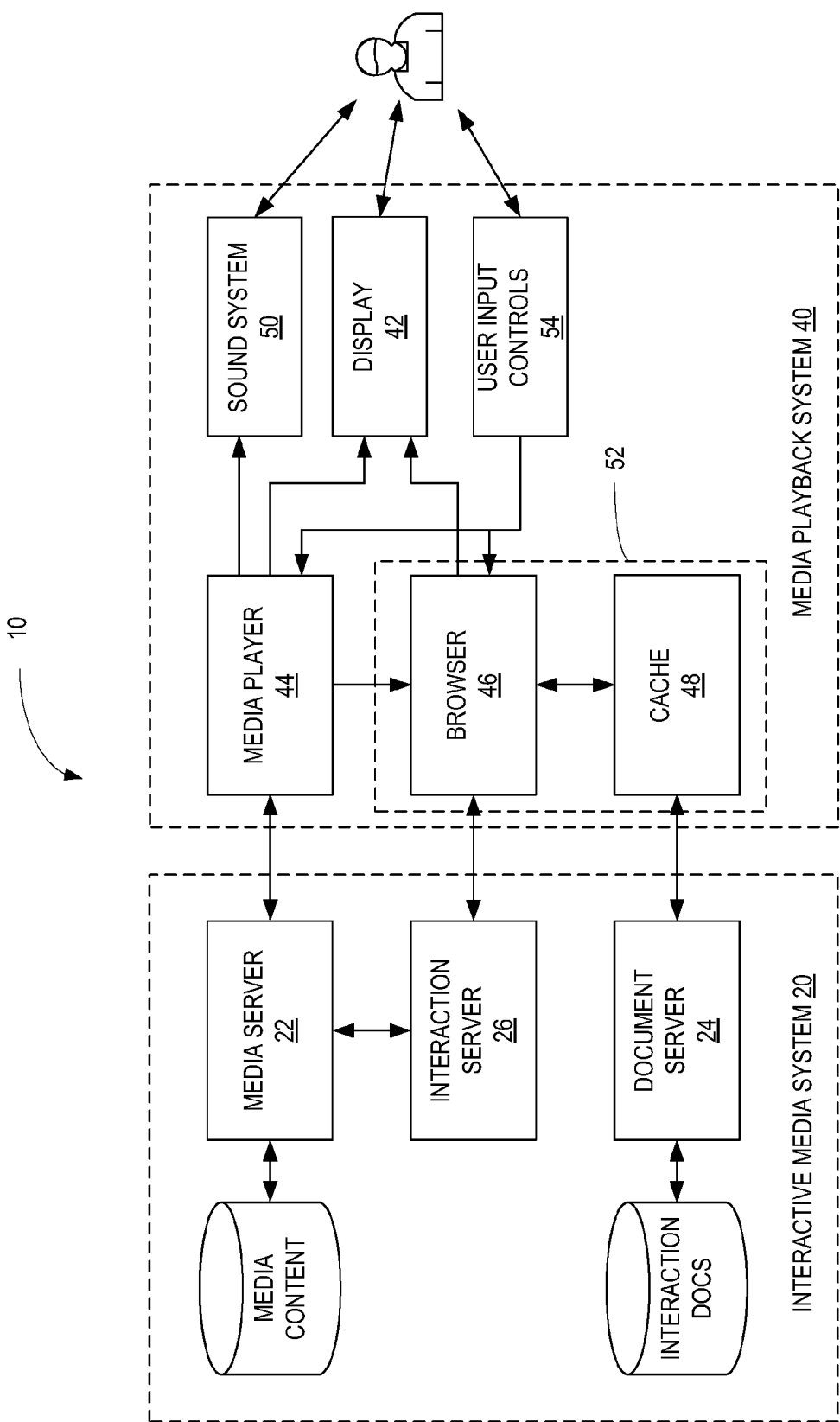
FIG. 1 illustrates a communication system for providing interactive media content to users.

FIG. 1 illustrates a communication system 10 for providing interactive media content to users. Communication system 10 comprises an interactive media system 20 operated by a content provider (e.g., broadcast company) or service provider, and a media playback system 40 to enable a user to access and play media content from the content provider's media library. Interactive media programs can be distributed in a variety of different electronic media over a variety of communication networks, such as broadcast networks, mobile networks, Internet Protocol (IP) networks, or some combination thereof.

The interactive media system 20 includes one or more media servers 22 for storing media content that is available to users, one or more document servers 24 for storing interaction documents that define interaction events associated with the media content, and one or more interaction server 26 for handling the interaction events. The media content stored by the media server(s) 22 may be any type of media, such as video content, audio content, audio/video content, or other streaming media. The interaction documents stored in the document server(s) 24 define interaction events associated with the media content. As will be hereinafter described, the interaction documents comprise scripts that are synchronized with the media content to generate interaction events at predetermined points during the playback of the media content. The interaction documents may comprise, for example, SMIL documents, XML documents, etc. The interaction server 26 comprises a server, such as a web server, configured to handle or process interaction events. The interaction server 26 receives user input and responses from the media playback system 40. In some embodiments, the interaction server(s) 26 may also communicate with the media server(s) 22 in systems where user interaction is used to affect the media content.

The media playback system 40 comprises a display 42, a media player 44, an interaction controller 52, a sound system 50 to render media content to the user, and one or more user input controls 54 to input user responses. The display 42 and sound system 50 comprise any suitable devices for rendering video and audio content, respectively. The media player 44 comprises software and/or hardware to generate media streams rendered by the display 42 and sound system 50, respectively. For example, the media player 44 may implement decompression algorithms to decompress media streams to generate output data streams that are suitable for rendering by display 42 and/or sound system 50. In a preferred embodiment, the media player 44 may also record media content for later playback or viewing. The interaction controller 52 comprises one or more processors and memory to handle interaction events associated with a media program as hereinafter described. The user input controls 54 comprises any type of user input devices, such as keypads, buttons, pointing devices, navigation controls, touch sensitive controls, etc to enable a user to input responses to interaction events. In some embodiments, the display 42 may comprise a touch screen display that also functions as a user input device 54. The media playback system 40 may be incorporated in a home entertainment system, or in a mobile terminal, such as a cellular telephone, personal digital assistant device, media player, or laptop computer.

The interaction controller 52 includes a browser 46 and cache 48. Browser 46 is an application executed by a processor in the media playback system 40 through which user interaction takes place. Cache 48 stores interaction documents. In one exemplary embodiment, user interaction takes place though an overlaid browser window on the display 42 of the media playback system 40, and user input and responses may be captured by associated Javascripts or other types of scripts. The browser 46 generates interaction events for a particular media program based on the associated interaction document stored in the cache 48, captures user inputs and responses, and sends the user input and responses to the interaction server 26. As an example of user interaction with media content, the interactive program may incorporate viewer polls or questions. The interaction document that defines the interaction events and the associated scripts are stored in cache 48. The interaction document defines a timeline for the interaction events which is synchronized with the media content. Thus, the interaction events are not tied to triggers in the media stream. The media player 44 may trigger the interaction document when playback of the media content begins. In one exemplary embodiment, a Uniform Resource Identifier (URI) may be embedded at the beginning of the media stream that identifies the corresponding interaction document. The media player 44 captures the URI when the media stream is initiated and triggers the interaction document.

The interaction document may be downloaded from the document server 24 at any time prior to viewing or rendering of the media content, and held in cache 48 until required for viewing. The document server 24 may, for example, comprise a web server that provides the user with an interface for downloading interaction documents. The document server 24 may allow the user to set-up periodic downloads for frequently watched programs, such as frequently watched game shows, so that the interaction documents are available when needed. The user may, in some embodiments, subscribe to a service where interaction documents are downloaded automatically to cache 48 of the media playback system 40 based on user specified preference or observed viewing patterns.

Figure 2:
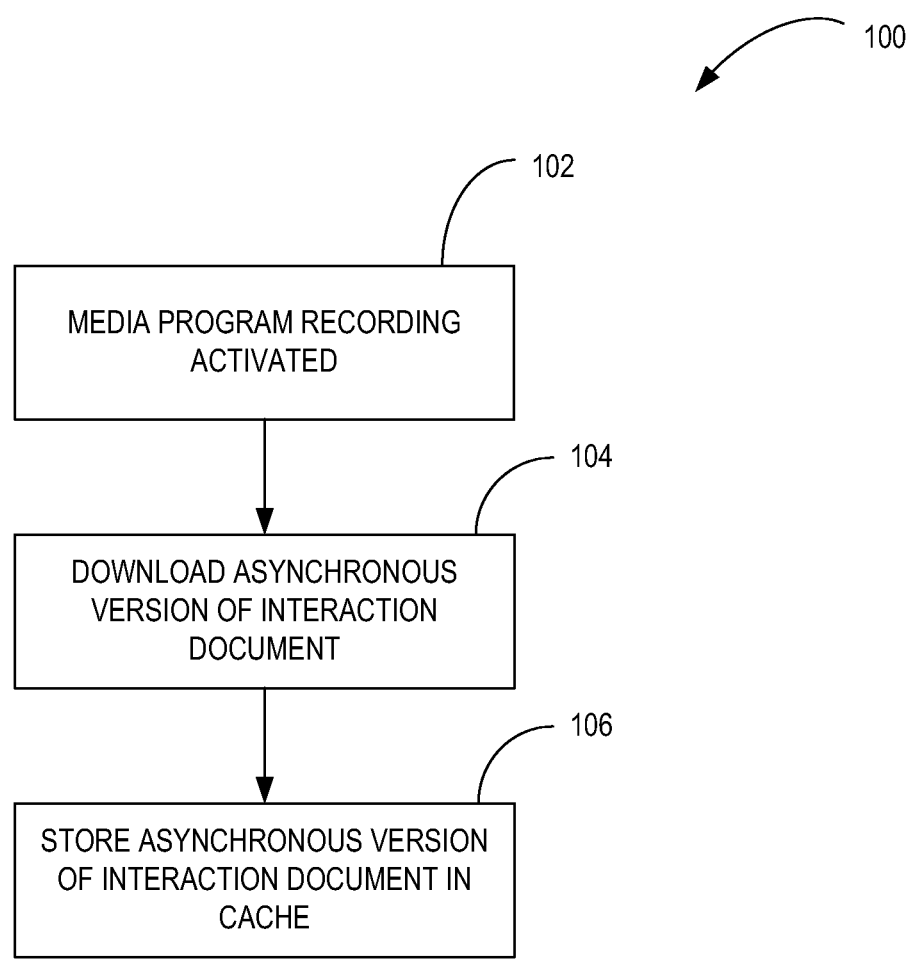
FIG. 2 illustrates an exemplary method for downloading interaction documents.

The media playback system 40 may also be configured to automatically download interaction documents whenever a media program is recorded so that the interaction document is available when the user subsequently views the program. The FIG. 2 illustrates an exemplary method 100 for downloading interaction documents for interactive media programs. It is assumed that the media player 44 includes the capability to record media programs. When the user enters a command into the media player 44 to record a media program (block 102), the media player 44 provides the browser 46 in the interaction controller 52 with the relevant program information. The browser 46 downloads the interaction document for the media program (block 104) from the document server 24 responsive to the command to record the media program and stores the interaction document in cache 48 (block 106). If the command to record the program is entered in advance of the scheduled broadcast of the media program, the downloading may occur before actual recording of the media program.

Because the interaction document may be downloaded in advance of viewing, a mechanism is needed to ensure the freshness of the interaction document. For example, when the interaction document is triggered, the download time may be compared to the current time to determine an age of the interaction document. If the downloaded document is "old," the interaction controller 52 may query the document server 24 for a more recent version of the interaction document. If a more recent version is available, the interaction controller may download the updated interaction document from the document server 24.

In the case of live events that are recorded by the user for later viewing, the interactions that may have taken place during the original transmission of the event may not be valid when a recording of the program is subsequently viewed. As one example, a talent show that is broadcast live may include interaction events that allow the users to vote for their favorite performers. As another example, a talk show may allow users to submit questions to the host of the show. These types of interaction events may not be valid after the original broadcast and may frustrate or annoy users that attempt to interact when the recorded version of the show is viewed. In this case, two different interaction documents may be defined: a real-time version for use during the original transmission and an asynchronous version for recording and subsequent viewing of the original transmission. The real-time version of the interaction document in the cache 48 of the media playback system 40 may be replaced by an asynchronous version of the interaction document after the original transmission. The asynchronous version may eliminate or change interaction events that are no longer relevant when a recording is being viewed, or substitute different interaction events. For example, the original transmission may include voting events that allow users to vote for there favorite performer. During the live broadcast, the votes can be tallied and used to select a winner. Votes made while viewing a recorded version of the interactive program may be used for different purposes, such as to generate feedback from viewers regarding viewer preferences. Allowing different interactions may stimulate repeat viewing of the media program.

In one exemplary embodiment, the Session Initiation Protocol (SIP) subscription method may be used to update interaction documents stored in cache 48 of the media playback system 40. When a user records a live event, the media playback system 40 may use the SIP subscription method to subscribe to update notifications from the document server. When the interaction document is updated, the document server 24 may send a SIP notification message to the media playback system 40. The media playback system 40 may then retrieve the updated interaction document from the document server 24.

Figure 3:
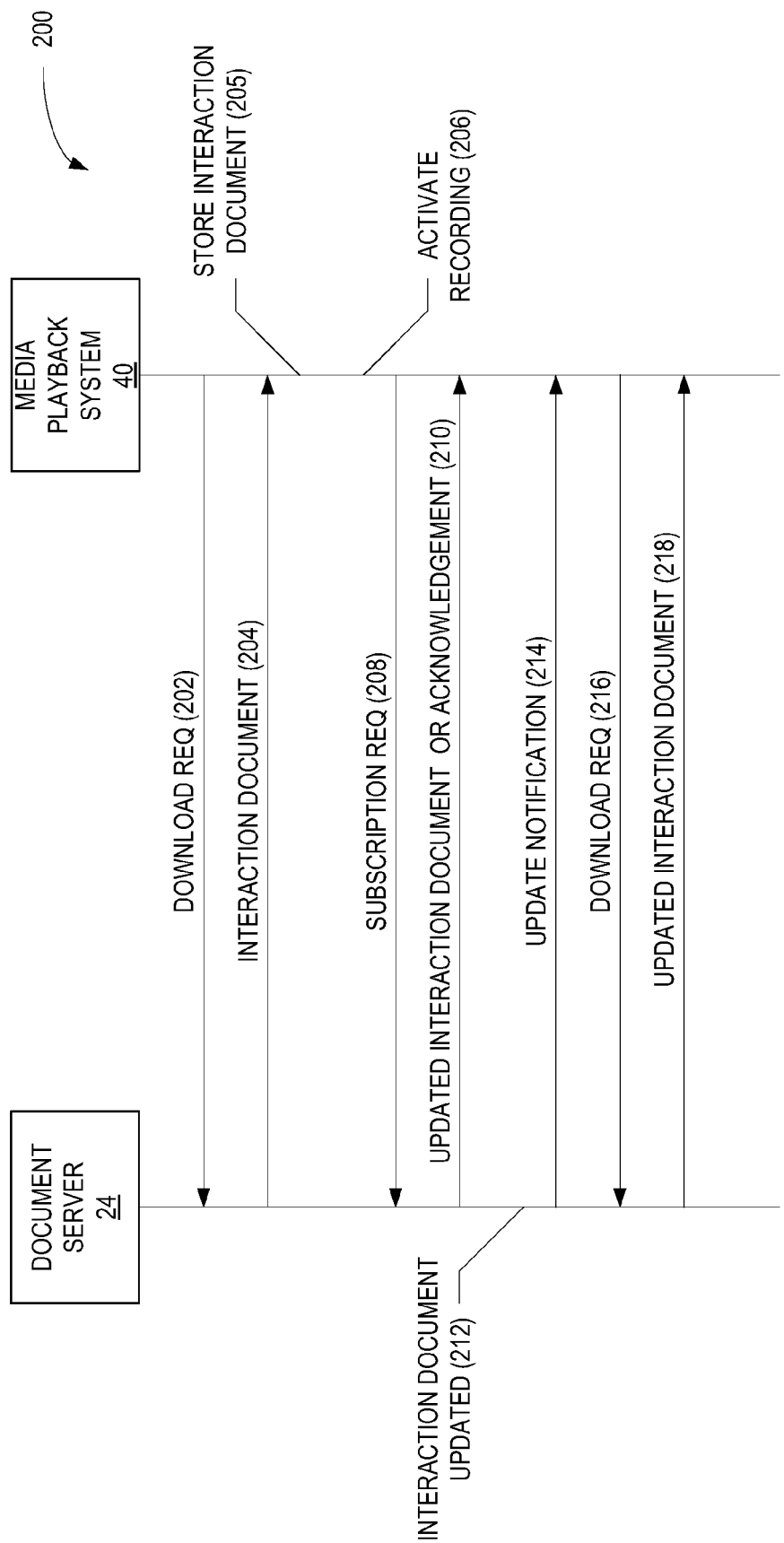
FIG. 3 illustrates a first exemplary method for updating previously downloaded interaction documents.

FIG. 3 illustrates an exemplary method 200 for updating interaction documents according to one embodiment of the invention. The method can be implemented using SIP Subscribe and Notify methods. Those skilled in the art will appreciate, however, that other protocols could also be used to create subscriptions for interaction documents. The user of the media playback system 40 downloads a first version of an interaction document for an interactive media program from the document server 24 (steps 202, 204), and stores the first version in cache 48 (step 205). The browser 46 of the interaction controller 52 can be used for downloading interaction documents from the interaction server 46. The browser 46 sends a download request (e.g., HTTP GET) including a program identifier to the document server 24 (step 202). In response to the request, the document server 24 returns an interaction document for use during viewing of the original broadcast of a live event (step 204).

Subsequently, the user initiates recording of the live event (step 206). In response to the initiation of recording, the web browser sends a subscription request to the document server 24 to subscribe to receive updated or new versions of the interaction document (step 208). If an updated version is stored by the document server 24, the document server may immediately send the updated version of the interaction document responsive to the subscription request (step 210). If there are no updated versions available at the time of the subscription, the document server 24 may return an acknowledgement to indicate that the subscription request was successfully received and processed (step 210). Subsequently, when an updated version of the interaction document becomes available (step 212), the document server 24 sends an update notification to the interaction controller 52 (step 214). The update notification may include a link to the updated version of the interaction document. The interaction controller 52 may then download the updated version by sending a download request to the document server 24 (step 216). The document server 24 returns the updated interaction document responsive to the download request (step 220). Steps 214-220 may be repeated if a later version of the interaction document becomes available.

The subscription request once made may be subsequently canceled. As one example, cancellation of a previous subscription may occur automatically by user interactions when the user views a media program.

Figure 4:
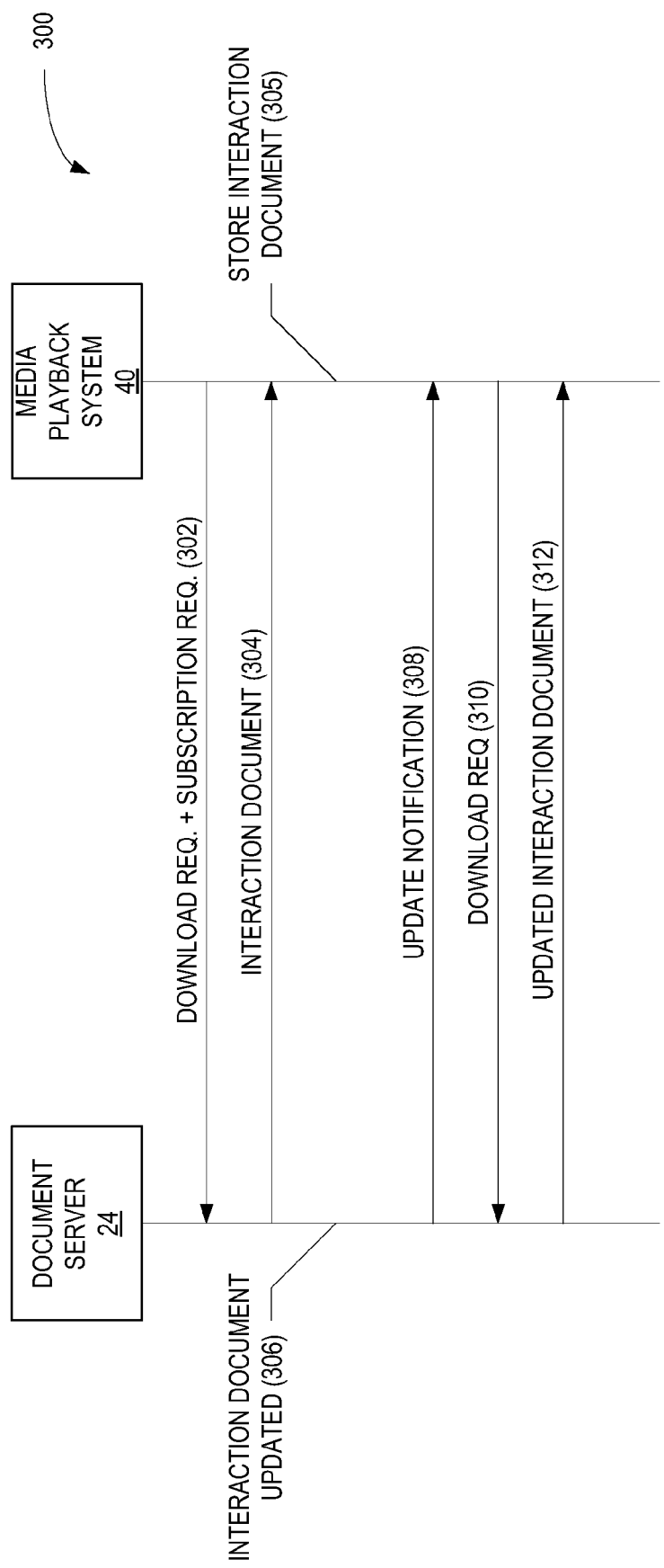
FIG. 4 illustrates a second exemplary method for updating previously downloaded interaction documents.

FIG. 4 illustrates an alternate method 300 for updating interaction documents where the subscription is created at time the original version of the interaction document is downloaded (steps 302-304) and stored in cache 48 (step 305). In this method 400, the browser 46 sends a download request including a program identifier to the document server 24 (step 302). The download request may include a subscription request for future updates for the downloaded interaction document. In response to the download request, the document server 24 returns an interaction document for use during viewing of the original broadcast of a live event (step 304). When an updated version of the interaction document subsequently becomes available (step 306), the document server 24 sends an update notification to the interaction controller 52 (step 308). The update notification may include a link to the updated version of the interaction document. The browser 46 in the interaction controller 52 may then download the updated version by sending a download request to the document server 24 (step 310). The document server 24 returns the updated interaction document responsive to the download request (step 312). Steps 306-312 may be repeated if a later version of the interaction document becomes available.

In another exemplary embodiment, the interaction controller 52 may implement a full-fledged web server that also manages the cache 48. In this embodiment, HTTP POST and PUT operations are enabled thereby allowing third party providers to pre-provision the cache 48 and to provide updates to previously-downloaded interaction documents. If the interaction controller 52 implements a web server, the document server 24 may keep a record of downloads for each user and use standard HTTP POST and PUT operations to upload or push the revised interaction documents to the cache 48 of the media playback system 40 as they become available without an explicit download request.

Figure 5:
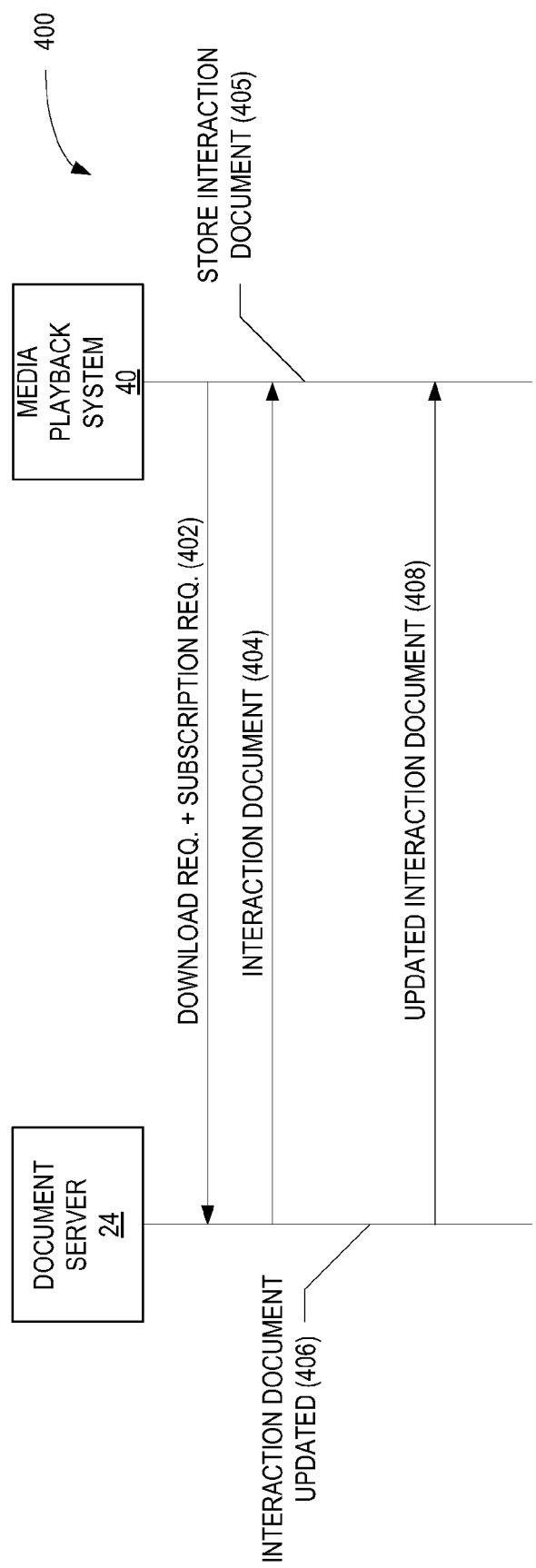
FIG. 5 illustrates a third exemplary method for updating previously downloaded interaction documents.

FIG. 5 illustrates an exemplary method 400 for updating interaction documents using a push technique. This method may be implemented, for example, using HTTP. The method 400 begins with the media playback system sending a download request to the document server 24 step 402). The document server 24 returns the requested interaction document to the requestor and makes a record of the download (step 404). The interaction document is stored in cache 48 (step 405). During the downloading of the original interaction document, the requestor may subscribe to further updates of the interaction documents. When an updated version of the interaction document subsequently becomes available (step 406), the document server 24 sends the updated interaction document without waiting for an explicit download request using HTTP POST or PUT procedures (step 408). The user may during the original download refuse to receive updated interaction documents. Also, the user may be allowed to cancel a previous request for updated documents. For example, when the user views a program, the media playback system may cancel the request for future updates.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for updating an interaction document defining one or more interaction events for an interactive media program, the method comprising:
   storing a first version of the interaction document in a memory circuit;
   subscribing to receive updates for the interaction document from a document server, wherein subscribing to receive the updates to the interaction comprises sending a subscription request to the interaction document server responsive to recording the interactive media program;
   receiving an update from the document server via a communication network responsive to the subscription; and
   wherein the first version of the interaction document is for use during a live broadcast of an interactive media program, and wherein an updated version of the interaction document is for use during a delayed viewing of the interactive media program.

2. The method of claim 1, wherein the subscription request is sent to the interaction document server at the time the first version of the interaction document is downloaded.

3. The method of claim 1, wherein receiving an update comprises receiving an update notification from the document server indicating the availability of the updated version of the interaction document.

4. The method of claim 1, wherein receiving an update comprises receiving the updated version of the interaction document from the document server.

5. The method of claim 3, wherein receiving an update further comprises downloading the updated version of the interaction document from the document server responsive to the update notification.

6. The method of claim 4, wherein said updated version of said interaction document comprises interaction events not included in said first version of said interaction document to stimulate repeat viewing of the media program.

7. A media playback system including a media player for playing an interactive media program, the media playback system comprising:
   a memory circuit to store a first interaction document associated with the interactive media program, wherein the first interaction document defines one or more interaction events for the interactive media program; and
   a processor circuit configured to:
      generate interaction events based on the first interaction document and capturing user responses to the interaction events while the interactive media program is being played;
      subscribe to updates to the first interaction document from a document server by sending a subscription request to the interaction document server responsive to the recording of the interactive media program, and receive said updates from the document server responsive to the subscription via a communication network; and
      wherein the first interaction document is for use during a live broadcast of an interactive media program, and wherein an updated version of the first interaction document is for use during a delayed viewing of the interactive media program.

8. The media playback system of claim 7, wherein the processor circuit is further configured to send the subscription request to the interaction document server at the time a first version of the interaction document is downloaded.

9. The media playback system of claim 7, wherein the updates comprise an update notification indicating the availability of the updated version of the first interaction document.

10. The media playback system of claim 7, wherein an update comprises the updated version of the first interaction document.

11. The media playback system of claim 7, wherein at least one of said memory circuit and said processor circuit are disposed in a mobile terminal.

12. The media playback system of claim 9, wherein said processor circuit is further configured to download the updated version of the first interaction document from the document server responsive to the update notification.

13. The media playback system of claim 10, wherein said updated version of said first interaction document comprises interaction events not included in a first version of said first interaction document to stimulate repeat viewing of the media program.

14. A method for updating an interaction document defining one or more interaction events for an interactive media program, the method comprising;
   storing a first version of the interaction document in a memory circuit prior to a scheduled showing of the interactive media program;
   initiating recording of the interactive media program at the scheduled broadcast time;
   sending a subscription request to an interaction document server via a communication network responsive to initiating recording of the interactive media program; and
   receiving an updated version of the interaction document from the interaction document server via the communication network responsive to the subscription request, wherein the first version of the interaction document is for use during a live broadcast of an interactive media program, and wherein an updated version of the interaction document is for use during a delayed viewing of the interactive media program.

* * * * *

UNITED STATES PATENT AND TRADEMARK OFFICE
CERTIFICATE OF CORRECTION

PATENT NO. : 8,782,733 B2
APPLICATION NO. : 12/935566
DATED : July 15, 2014
INVENTOR(S) : Hjelm Page 1 of 1

It is certified that error appears in the above-identified patent and that said Letters Patent is hereby corrected as shown below:

In the Specification

In Column 1, Line 52, delete "triggered by 35" and insert -- triggered by --, therefor.

In Column 4, Line 56, delete "there" and insert -- their --, therefor.

In Column 5, Line 18, delete "interaction server 46." and insert -- interaction server 26. --, therefor.

Signed and Sealed this
Twelfth Day of May, 2015

Michelle K. Lee
*Director of the United States Patent and Trademark Office*